United States Patent [19]
Manghisi et al.

[11] 3,915,969
[45] Oct. 28, 1975

[54] 2,2-DISUBSTITUTED BENZODIOXOLES
[75] Inventors: Elso Manghisi, Monza; Aldo Salimbeni; Alessandro Subissi, both of Milan, all of Italy
[73] Assignee: Istituto Luso Farmaco D'Italia S.r.l., Milan, Italy
[22] Filed: Apr. 5, 1973
[21] Appl. No.: 348,096

[30]    Foreign Application Priority Data
   Apr. 11, 1972   Italy................................. 23014/72
   Mar. 20, 1973   Italy................................. 21882/73

[52] U.S. Cl. ... 260/247.7 V; 260/239 B; 260/243 B; 260/268 BC; 260/293.58; 260/340.5; 424/244; 424/246; 424/248; 424/250; 424/267; 424/274; 424/282
[51] Int. Cl.²........................................ C07D 317/46
[58] Field of Search . 260/247.7 G, 268 BC, 293.58, 260/340.5

[56]          References Cited
      FOREIGN PATENTS OR APPLICATIONS
   1,135,340  12/1968  United Kingdom
               OTHER PUBLICATIONS
Benoit et al., Bull. Soc. Chim. France, 638–642 (1960).

*Primary Examiner*—G. Thomas Todd
*Attorney, Agent, or Firm*—Stevens, Davis, Miller & Mosher

[57]            ABSTRACT
2-Aminoalkyl-1,3-benzodioxoles which may be substituted have interesting pharmacological properties as local anaesthetics, anti-arrhythmics, hypotensives, and α-adrenolytics.

30 Claims, No Drawings

2,2-DISUBSTITUTED BENZODIOXOLES

The present invention provides, as new compounds, the 1,3-benzodioxoles of the formula:

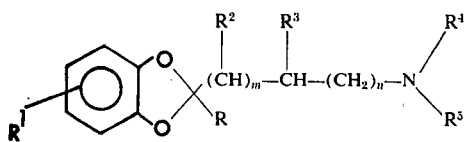   I and their optical isomers, stereoisomers, and pharmaceutically acceptable salts, in which R represents hydrogen, lower alkyl unsubstituted or substituted by halogen or hydroxy, or aryl or aralkyl which is unsubstituted or substituted in the aromatic ring by halogen, alkyl, hydroxy or alkoxy; or R can be attached to the alkylene chain which is also linked to position 2 of the benzodioxole ring, to form a spirane derivative of 4 to 7 carbon atoms; $R^1$ represents hydrogen, one or more halogen atoms; lower alkyl, halogenated lower alkyl, a methylamino group $CH_2$

hydroxy, alkoxy, a sulphonic group, a sulphonamide group, an N,N-dialkylsulphonamide group, nitro, amino, substituted amino, or an alkanesulphonylamino group, or $R^1$ can additionally be a benzenic ring fused to the benzodioxole ring; $R^2$ represents a hydrogen atom or an alkyl, aryl or hydroxyl group; $m$ represents 0 or 1; $R^3$ represents hydrogen, lower alkyl, aryl, hydroxyl or cyano; $n$ represents 0, 1 or 2, and is different from 0 when $m$ is 0; and

represents a substituted or unsubstituted amino group, with the proviso that when R is methyl and

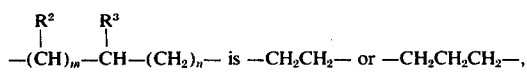 is —CH$_2$CH$_2$— or —CH$_2$CH$_2$CH$_2$—,

—NR$^4$R$^5$ is not dimethylamino or piperidino.

R$^4$ and R$^5$ may be hydrogen, lower alkyl, monocyclic, carbocyclic aryl, especially phenyl, monocarbocyclic lower arylalkyl, especially phenylalkyl. The N-monosubstituted amino-groups are therefore N-alkylamino, such as methylamino, ethylamino, propylamino etc., N-cycloalkylamino, such as N-cyclohexylamino, N-hydroxyalkylamino, such as N-2-hydroxyethylamino, N-2-hydroxy-2-(3', 5'-dihydroxyphenyl)ethylamino, N-arylalkylamino, such as benzylamino etc., N-dialkylamino alkylamino such as N,N-diethylethylenediamino, N-arylamino, such as N-phenylamino or N-phenylamino substituted. The N,N-disubstituted amino groups are N,N-dialkylamino, for example N,N-dimethylamino, N-methyl-N-ethylamino, N,N-diethylamino, N,N-di-n-propylamino, N,N-diisopropylamino etc., as well as N-cycloalkyl-N-alkylamino in which the cycloalkyl has from 3 to 8 atoms, such as N-cyclopentyl-N-methylamino, N-cyclohexyl-N-hexylamino etc., N-lower alkyl-N-phenylalkylamino, for example N-benzyl-N-methylamino, N-ethyl-N-phenylethylamino, etc., or any other disubstituted amino-group, such as for instance N-hydroxyalkyl-N-alkylamino in which the hydroxyl is separated from the nitrogen by at least two atoms of carbon, for example N-ethyl-N-(2-hydroxyethyl)-amino, etc., or N,N-dihydroxyalkylamino, for example N,N-di-(2-hydroxyethyl)amino etc., The

radical can also be a N,N-alkyleneimino-group in which the alkylene has from 3 to 8 carbon atoms, such as for example 1-pyrrolidino, 1-piperidino, 2-methyl-1-piperidino, 4-hydroxy-4-phenyl-1-piperidino, 4-hydroxy-4-p-chlorophenyl-1-piperidino, 4-carbonamino-4-phenyl-1-piperidino, 4-benzoylamino-1-piperidino, 4-p-fluorobenzoyl-1-piperidino, etc. 1-N,N-(1.6-hexene)imino, 1-N,N-(1.7-heptene)imino, etc. N,N-oxo-alkene-imino in which the alkene has preferably 4 carbon atoms, for example 4-morpholino, N,N-thio-alkene-imino, in which the alkene has preferably four carbon atoms, such as for example 4-thiomorpholine etc., or N,N-imino-alkene-imino in which the alkene has from 4 to 6 carbon atoms and in which the second nitrogen can be substituted for instance by a lower alkyl, such as methyl, ethyl, propyl, etc., lower hydroalkyl, such as hydroxyethyl, alkoxy-lower-alkyl, such as methoxyethyl, lower alkoyloxy alkyl, such as acetoxyethyl, lower arylalkyl such as benzyl, diphenylmethyl, 2-phenylethyl, 2-3'-indolyl-ethyl etc., or by a monocarbocyclic aryl, preferably phenyl, which can be replaced or not by atoms of halogen or alkyl, lower alkoxy or nitro groups, such as phenyl, 2-tolyl, 2,3-xylyl, 4-chlorophenyl, 2-methoxyphenyl, etc., or, finally, by a monocyclic heterocyclic aryl, such as e.g. 2-pyridine, 2-furan, 2-thiophene, etc., and which can be piperazine, 4-methyl-1-piperazine, 4-ethyl-1-piperazine, 4-(2-hydroxyethyl)-1-piperazine, 4-(2-acetoxyethyl)-1-piperazine, 4-benzyl-1-piperazine, 4-[2'-(3'-indolyl)-ethyl]-1-piperazine, 4 -phenyl-1-piperazine, 4-p-chlorophenyl-1-piperazine, 4-2'-methoxyphenyl-1-piperazine, 4-2'-pyridyl-1-piperazine, 4-3'-pyridyl-1-piperazine, etc.

Especially valuable compounds are those in which R$^4$ and R$^5$ are each hydrogen, alkyl, hydroxyalkyl, dialkylaminoalkyl, morpholinoalkyl, pyrrolidinoalkyl, piperidinoalkyl, alkylpiperidinoalkyl, phenyl, phenylalkyl, hydroxyphenyl hydroxyalkyl, dihydroxyphenyl, hydroxyalkyl, or R$^4$ and R$^5$ are joined together to form an alkylene-imino ring of 3 to 8 carbon atoms, or a morpholino or piperazine ring, the said rings being unsubstituted, substituted or disubstituted on a carbon atom by alkyl, hydroxyalkyl, phenyl, chlorophenyl, or hydroxy or on a nitrogen atom, by alkyl, hydroxyalkyl, or phenyl, the aforesaid alkyls containing 1 to 6 carbon atoms each.

From the compounds of the general formula I, containing a basic group, it is possible to prepare salts with pharmaceutically acceptable inorganic acids, such as e.g. hydrochloric, hydrobromic, nitric, sulphuric, phosphoric acids etc. as well as carbonylic organic acids, such as e.g. acetic, propionic, glycolic, malonic, succinic, maleic, hydroxymaleic, fumaric, malic, tartaric, citric, glucuronic, benzoic, mandelic, salicylic, 4-aminosalicyclic, 2-phenoxybenzoic, pamoic, nicotinic, isonicotinic acids, etc., or sulphonic organic acids, such as e.g. methanesulphonic, ethanesulphonic, 2-hydroxyethanesulphonic acids, 1,2-ethane-disulphonic, p-toluenesulphonic, naphthalene-2-sulphonic etc. Mono- or poly-salts are formed according to relative number the salifiable groups present in the molecules.

In the same way, from the compounds of the general formula I having an acid group, it is possible to prepare pharmaceutically acceptable salts with metals (such as sodium, potassium, calcium, magnesium, aluminium, etc.) or organic bases (such as morpholine, pyrrolidine, ethanolamine, N,N-dibenzylethylenediamine, etc.).

The invention covers also the stereoisomers and the optical isomers which can be present when one or more of the $R^1$, $R^2$ and $R^3$ substituents are different from hydrogen.

The methods of preparation for the above-mentioned compounds are divided into methods for closing the benzodioxole ring in order to obtain final or intermediate products, and methods for transforming the functional groups of the intermediate products (as summarised above) in order to obtain those of the general formula I.

The methods for closing the benzodioxoles are known and have been described in our Application No. 20407/72. According to such methods, the benzodioxole ring can be obtained by reaction of a pyrocatechol with a halogenketone, nitroketone, ketoester, ketoamide, ketonitrile, di-ketone or ketoamine having the carbonyl group in the α-, β-, γ or Δ-position in respect of the other group, in a straight, branched or cyclic chain. Instead of compounds containing a carbonyl group, derivatives thereof can also be used, such as acetals from aliphatic alcohols, gem-di-chloro or di-bromine compounds or enolethers and enamines. Pyrocatechol can be replaced by one of its cyclic derivatives with sulphurous or carbonic acid.

Phosphoric anhydride is the most popular condensing agent but other agents can be used, such as sulphuric, phosphoric, polyphosphoric, hydrochloric or trifluoro-acetic acids; pyridine hydrochloride, calcium chloride, para-toluene-sulphonic acid, ion-exchange resins (for instance Amberlite IRA 120), dicyclohexylcarbodiimide or molecular sieves.

The reaction temperature can vary from 0° to 150°C. according to whether an inert organic solvent is present or not (e.g. an aliphatic or aromatic hydrocarbon or a halogenated derivative, ether, ester or amide).

According to another synthesis method, the pyrocatechol, or a reactive derivative thereof, is made to react with a dibromine derivative having the formula:

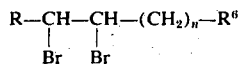

in which R and n are as defined above and $R^6$ represents a halogen atom, $NO_2$, an ester, amide or nitrile group or an acyl group of an aliphatic or aromatic organic acid or an amino group of the formula: $NR^4R^5$.

Instead of the dibromine derivative, it is also possible to use a bromoolefin having the formula:

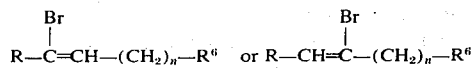

especially when $n = 0$. The reaction is preferably brought about in dimethylformamide in the presence of sodium hydride, at room temperature. However the dimethylformamide can be replaced by other solvents, such as those set out above (and, additionally, ketones, for instance acetone, methyl ethyl ketone, etc.) and the sodium hydride can be replaced by other organic and inorganic basic catalysts.

In the cases when sodium methylate is used, benzodioxole is formed together with an isomeric benzodioxane, which can be separated by an appropriate process.

The benzodioxole ring can also be obtained by reaction of a pyrocatechol with an acetylene derivative

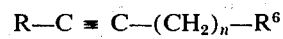

in which the various symbols have the significance indicated above. The reaction takes place in an anhydrous solvent, belonging to the classes set out above, in the presence of an organic or inorganic basic catalyst (for instance tributylamine or potassic carbonate) at a temperature from 0°C. to 100°C.

The intermediate products obtained by means of the aforesaid reactions may be converted into compounds of the general formula I by using standard methods of organic chemistry. In the following description the various symbols have the significance given above unless otherwise stated. Thus the final products can be obtained by the reaction of a halogen derivative with an amine having the formula $HNR^4R^5$ by employing Hoffman's method or potassium phthalimide according to Gabriel's method or hexamine in Delepin's method.

According to the invention, alkylation of the amines having the formula:

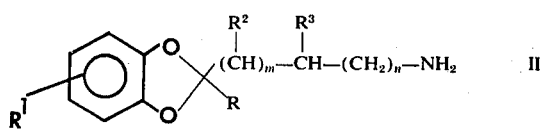

with alkyl, aryl or arylalkyl halides of formula $R^4X$ and-/or $R^5X$ is also possible.

The amides, nitriles and oximes (these latter obtained from the ketones set out above) can be additionally hydrogenated catalytically or by hydrides of alkali metals. Reductive amination is possible on ketones as well as reduction of the Schiff bases obtained by reaction of the ketone with an amine having the formula: $HNR^4R^5$ or by reaction of a primary amine having the formula II with a ketone or an aliphatic or aromatic aldehyde.

The abovementioned primary amine can be obtained by reduction of the corresponding nitro compound or by hydrogenolysis of the corresponding benzyl derivative.

The abovementioned amine can also be obtained by the degradation processes of Hofmann, Curtius, Schmidt or Ritter.

Basic ketones can additionally be obtained by reacting the ketones having the formula:

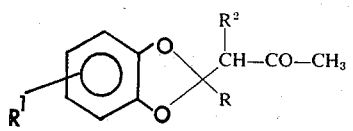

with amines having the formula: HNR⁴R⁵ in a Mannich reaction, and subsequently reducing the carbonyl group to $CH_2$ or CHOH by using conventional methods for the reduction of ketones (Wolf-Kishner, catalytic hydrogenation, reduction with hydrides, etc.).

When $R^3$ stands for a hydroxy group, epoxides having the formula:

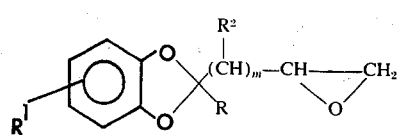

and chlorhydrins having the formula:

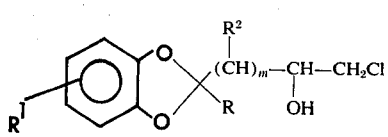

(obtained by reducing the corresponding chloroketones) can also react with amines having the formula: HNR⁴R⁵.

Moreover, when $R^3$ represents an electron-attracting group, the active hydrogens of the carbon in a position alpha to such group can be alkylated by the action of chloro compounds having the formula:

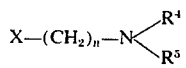

Finally, when $R^1$ represents a halogen, nitro, or sulphonic group it is possible for these substituents to be introduced directly into the intermediate compounds or into the final ones where $R^1$ represents hydrogen (namely by halogenation, nitration or sulphonation according to standard practice).

The benzodioxole derivatives of the invention have interesting pharmacological properties and, according to the substituents present therein, have an antiarrhythmic, or α-adrenolytic action. They lower the blood pressure, depress the C.N.S. and can be used as a local anaesthetic. Such substances can be taken locally, by mouth or by injection through the appropriate pharmaceutical preparations in a solid, liquid or suspension form (ointments, lotions, tablets, capsules, phials, linctuses, etc.).

The following lists summarise the pharmacological properties of the compounds of the present invention. The compounds are denoted by the following numbers:

LR 282 : 2-p-fluorophenyl-2-(gamma-pyrrolidinopropyl)-1,3-benzodioxole citrate.
LR 390 : N,N-Diethyl-N'-(2-phenyl-1,3-benzodioxole-2-yl-ethyl)-ethylenediamine-dimaleate.
LR 345 : 1-(2-Phenyl-1,3-benzodioxol-2-yl)-2-aminopropane-maleate.
LR 358 : N,N-dimethyl-2-(2-phenyl-1,3-benzodioxol-2-yl)-ethylamine hydrochloride.
LR 359 : N,N-diethyl-N'-[(2-methyl-1,3-benzodioxol-2-yl)-ethyl]-ethylenediamine-dimaleate.
LR 369 : 2-Phenyl-2-(alpha-cyano-gamma-pyrrolidinopropyl)-1,3-benzodioxole citrate.
LR 400 : 2-p-Fluorophenyl-2-(gamma-N-phenyl-piperazinopropyl)-1,3-benzodioxole-dihydrochloride.
LR 425 : 2-Methyl-2-beta-morpholinoethyl-1,3-benzodioxole hydrochloride.
LR 426 : N-isopropyl-2-(2-methyl-1,3-benzodioxol-2-yl)-ethylamine maleate.
LR 427 : N-methyl-N'-(2-methyl-1,3-benzodioxol-2-yl-ethyl)-piperazine hydrochloride.
LR 428 : N-beta-hydroxyethyl-N'-(2-methyl-1,3-benzodioxol-2-yl-ethyl)-piperazine dihydrochloride.
LR 429 : N,N-dimethyl-N'-(2-methyl-1,3-benzodioxol-2-yl-ethyl)-ethylenediamine dihydrochloride.
LR 437 : N-phenyl-N'-(2-methyl-1,3-benzodioxol-2-yl-ethyl)-piperazine dihydrochloride.
LR 455 : N,N-diethyl-N'-(2-ethyl-1,3-benzodioxol-2-yl-ethyl)-ethylenediamine dimaleate.
LR 456 : N-benzyl-beta-(2-methyl-1,3-benzodioxol-2-yl)-ethylamine hydrochloride.
LR 461 : N-methyl-beta-(2-methyl-1,3-benzodioxol-2-yl)-ethylamine hydrochloride.
LR 468 : N-ethyl-beta-(2-methyl-1,3-benzodioxol-2-yl)-ethylamine hydrochloride.
LR 470 : N-phenyl-N'-methyl-N'-[(2-methyl-1,3-benzodioxol-2-yl)-ethyl]-piperazinium iodide.
LR 473 : Trimethyl-[(2-phenyl-1,3-benzodioxol-2-yl)-ethyl]-ammonium iodide.
LR 481 : N,N-bis(beta-hydroxyethyl)-2-(2-methyl-1,3-benzodioxol-2-yl)-ethylamine.
LR 483 : N,N-diethyl-N'-(2-methyl-1,3-benzodioxol-2-yl-methyl)-ethylenediamine dimaleate.
LR 484 : N,N-diethyl-N'-[(2-methyl-1,3-benzodioxol-2-yl)-propyl]-ethylenediamine dimaleate.
LR 485 : N,N-diethyl-N'-[(2-methyl-1,3-benzodioxol-2-yl)-ethyl]-propylenediamine dihydrochloride.
LR 486 : N,N-diethyl-N'-[(2,5-dimethyl-1,3-benzodioxol-2-yl)-ethyl]-ethylenediamine dimaleate.
LR 487 : N-methyl-N-[(2-methyl-1,3-benzodioxol-2-yl)-ethyl]-morpholinium iodide.
LR 489 : 2-(2-Methyl-1,3-benzodioxol-2-yl)-ethylamine hydrochloride.
LR 490 : N,N-diethyl-N'-methyl-N'-[2-methyl-1,3-benzodioxol-2-yl)-ethyl]-ethylenediamine dimaleate.
LR 491 : 4-Hydroxy-4-p-chlorophenyl-1-(2-methyl-1,3-benzodioxol-2-yl-ethyl)-piperidine hydrochloride.
LR 499 : N,N-diethyl-N'-(2-methyl-5-chloro-1,3-benzodioxol-2-yl-ethyl)-ethylenediamine hydrochloride.
LR 500 : N,N-diethyl-N'-spiro-[(1,3-benzodioxol-2,1'-cyclohexan-2'-yl)methyl]-ethylenediamine dimaleate.

LR 505 : N,N-diethyl-N'-(2-methyl-5,6-dibromo-1,3-benzodioxol-2-yl-ethyl)-ethylenediamine dihydrochloride.

LR 506 : N-(N',N'-diethylaminoethyl)-2-(2-methyl-1,3-benzodioxol-2-yl)-propylamine dimaleate.

LR 508 : N,N-diethyl-N'-(2-methyl-1,3-naphthodioxol-2-yl-propyl)-ethylenediamine dihydrochloride.

LR 524 : 2-Methyl-2-(beta-piperidinoethyl)-5-piperidinomethyl-1,3-benzodioxole dihydrochloride hemihydrate.

LR 548 : 1-p-Hydroxyphenyl-2-[(2-methyl-1,3-benzodioxol-2-yl-ethyl)amino]-propanol-1-hydrochloride.

The anti-inflammatory property has been studied in rats whose paws were affected by oedema caused by carragenine (Niemegeers C.J.E. J. Pharm. Pharmacol, 16, 810, 1964).

The analgesic property has been assessed in mice by using the acetic acid stretching test (Arrigoni Martelli E. Boll. Chim. Farm., 107, 29, 1968) and tail clipping (C. Bianchi and A. David, J. Pharm. Pharmacol. 12, 449, 1960).

The anti-cough property has been assessed in guinea pigs exposed to ammonia aerosol (B. Silvestrini, G. Maffii-Il Farmaco. Ed. Sc., vol.14, page 440, 1959).

The property as a local anaesthetic has been assessed in mice (C. Bianchi and A. J. David, J. Pharm. Pharmacol. 12, 449, 1960) whereas the arrhythmic property has been assessed in rats (M. R. Malinow, F. F Battle and B. Malamud, Arch. Intern. Pharmacodynamie, 102, 226, 1955) and in isolated atria of rabbits (G. S. Dawes, Brit. J. Pharmacol. 1, 90, 1946).

The $\alpha$-adrenolytic property has been assessed in mice (P. A. J. Janssen, C. J. E. Niemegeers and K. H. L. Schellekens, Arzneimittel Forschung, 15, 104–117, 1965).

| SUB-STANCES | ACUTE TOXICITY | | ANTI-INFLAMMATORY ACTION (OEDEMA BY CARRAG. RAT) | ANALGESIC ACTIVITY (MOUSE) mg/kg/os = % | |
|---|---|---|---|---|---|
| | Mouse $LD_{50}$ i.p. mg/kg | Rat $LD_{50}$ i.v. mg/kg | mg/kg/i.p. = % | TAIL CLIP | STRETCHING |
| LR 309 | 92 | — | 50 = 10 | 18 = 20 | — |
| LR 358 | 200 | — | — | — | 24.5 = 50 |
| LR 359 | 75 | 22 | — | — | 4.7 = 50 |
| LR 369 | 75 | — | — | — | 15 = 50 |
| LR 400 | >1000 | — | 200 = 30 | 200 = 10 | — |
| LR 455 | 175 | 55 | — | — | 35 = 37 |
| LR 456 | 150 | 15 | — | — | 30 = 36 |
| LR 461 | 100 | 45 | — | — | 20 = 28 |
| LR 468 | 100 | 40 | — | — | 20 = 22 |
| LR 470 | 70 | — | — | — | 14 = 20 |
| LR 473 | 150 | — | 30 = 30 | — | 30 = 25 |
| LR 483 | 150 | — | — | — | 30 = 22 |
| LR 484 | 75 | 30 | — | — | 15 = 33 |
| LR 485 | 250 | — | 50 = 6 | — | 50 = 28 |
| LR 486 | 150 | — | 30 = 11 | — | 30 = 37 |

| SUB-STANCES | ACUTE TOXICITY | | ANTI-INFLAMMATORY ACTION (OEDEMA BY CARRAG. RAT) | ANALGESIC ACTIVITY (MOUSE) mg/kg/os = % | |
|---|---|---|---|---|---|
| | Mouse $LD_{50}$ i.p. mg/kg | Rat $LD_{50}$ i.v. mg/kg | mg/kg/i.p. = % | TAIL CLIP | STRETCHING |
| LR 490 | 75 | — | — | — | 15 = 18 |
| LR 491 | 35 | — | — | — | 7 = 15 |
| LR 499 | 75 | 35 | 20 = 23 | — | 15 = 32 |
| LR 500 | 75 | 25 | — | — | 15 = 35 |
| LR 505 | 150 | 40 | 40 = 12 | — | — |
| LR 506 | 75 | — | 20 = 4 | — | — |
| LR 508 | 150 | 30 | 40 = 13 | — | — |
| LR 524 | 75 | — | 20 = 9 | — | — |

LD = Lethal Dose

| SUB-STANCES | ACUTE TOXICITY | | ANTI-ARRHYTHMIC ACTION | | LOCAL ANAESTHETIC ACTIVITY (Mouse's Tail) mg.Tot.i.d. = % act. |
|---|---|---|---|---|---|
| | Mouse $LD_{50}$ i.p. mg/kg | Rat $LD_{50}$ i.v. mg/kg | $CaCl_2$ RAT $ED_{50}$ mg/kg/i.v. | ELECTR. STIM. Isolated Atrium Rabbit $ED_{50}$ $\gamma$/ml. | |
| LR 282 | 175 | 16.3 | 1.2 | 10 | 1 = 30 |
| LR 309 | 92 | — | 3.5 | 6 | 2 = 40 |
| LR 358 | 200 | — | 7.5 | 30 = 15% | 2 = 30 |
| LR 359 | 75 | 22 | 4 | 30 | 1 = 50 |
| LR 425 | 650 | — | *10 = 20% | *10 = 23% | 2 = 30 |
| LR 426 | 100 | 19.5 | 2.1 | 30 | 2 = 30 |
| LR 427 | 112 | — | *10 = 20% | *10 = 20% | 0.5 = 20 |
| LR 428 | 90 | 18.5 | 1 | 30 | 1 = 30 |
| LR 429 | 175 | 52 | 3.2 | 18.5 | 1 = 50 |

| SUB-STANCES | ACUTE TOXICITY Mouse LD$_{50}$ i.p. mg/kg | ACUTE TOXICITY Rat LD$_{50}$ i.v. mg/kg | ANTI-ARRHYTHMIC ACTION CaCl$_2$ RAT ED$_{50}$ mg/kg/i.v. | ANTI-ARRHYTHMIC ACTION ELECTR. STIM. Isolated Atrium Rabbit ED$_{50}$ γ/ml. | LOCAL ANAESTHETIC ACTIVITY (Mouse's Tail) mg.Tot.i.d. = % act. |
|---|---|---|---|---|---|
| LR 455 | 175 | 55 | 2 | *30 = 40% | 2 = 30 |
| LR 456 | 150 | 15 | 1.8 | 10 = 43% | — |
| LR 461 | 100 | 45 | * 5 = 40% | — | — |
| LR 468 | 100 | 40 | 3 | *100 = 39% | 1 = 20 |
| LR 470 | 70 | — | *3.5 = 40% | *30 = 20% | 2 = 40 |
| LR 481 | 250 | — | *15 = 20% | — | 1 = 50 |
| LR 483 | 150 | — | 6 | *30 = 47% | 1 = 50 |

*maximum dosages administered

| SUB-STANCES | ACUTE TOXICITY Mouse LD$_{50}$ i.p. mg/kg | ACUTE TOXICITY Rat LD$_{50}$ i.v. mg/kg | ANTI-ARRHYTHMIC ACTION CaCl$_2$ RAT ED$_{50}$ mg/kg/i.v. | ANTI-ARRHYTHMIC ACTION ELECTR. STIM. Isolated Atrium Rabbit ED$_{50}$ γ/ml. | LOCAL ANAESTHETIC ACTIVITY (Mouse's Tail) mg.Tot.i.d. = % act. |
|---|---|---|---|---|---|
| LR 484 | 75 | 30 | 3 | 30 | 1 = 60 |
| LR 486 | 150 | — | 3.7 | 24 | 1 = 40 |
| LR 489 | 150 | — | *7.5 = 20% | — | 1 = 40 |
| LR 490 | 75 | — | 3 | 14.5 | — |
| LR 499 | 75 | 35 | 1.5 | 10 | — |
| LR 500 | 75 | 25 | 2.5 | 25 | — |
| LR 505 | 150 | 40 | 3 | 30 | — |
| LR 508 | 150 | 30 | 2.5 | 30 | — |
| LR 548 | 160 | — | 1 | 100 | — |

*maximum dosages administered.

| SUB-STANCES | ACUTE TOXICITY MOUSE LD$_{50}$ ip mg/kg | ACUTE TOXICITY RAT LD$_{50}$ iv mg/kg | ANTI-COUGHING ACTION (guinea pig) mg/kg/ip = % |
|---|---|---|---|
| LR 282 | 175 | 16.3 | 20 = 13 |
| LR 309 | 92 | — | 10 = 23 |
| LR 345 | 80 | — | 10 = 26 |
| LR 358 | 200 | — | 10 = 57 |
| LR 369 | 75 | — | 15 = 44 |
| LR 437 | 500 | — | 100 = 10 |
| LR 456 | 150 | 15 | 30 = 7 |
| LR 461 | 100 | 45 | 20 = 42 |
| LR 468 | 100 | 40 | 20 = 20 |
| LR 470 | 70 | — | 14 = 22 |
| LR 473 | 150 | — | 30 = 43 |
| LR 481 | 250 | — | 50 = 44 |
| LR 483 | 150 | — | 30 = 30 |
| LR 484 | 75 | 30 | 15 = 25 |
| LR 486 | 150 | — | 30 = 20 |
| LR 489 | 150 | — | 30 = 45 |
| LR 490 | 75 | — | 15 = 40 |
| LR 491 | 35 | — | 7 = 40 |

| SUB-STANCES | ACUTE TOXICITY MOUSE LD$_{50}$ ip mg/kg. | ACUTE TOXICITY RAT LD$_{50}$ iv mg/kg. | MOUSE'S ARTERIAL PRESSURE CAT mg/kg/iv = Δ mm.Hg | α-ADRENOLITIC ACTION (death of mouse caused by NA) mg/kg/os = % |
|---|---|---|---|---|
| LR 282 | 175 | 16.3 | 5 = − 60 (>30') | — |
| LR 359 | 75 | 22 | 7 = − 60 ( 5') | — |
| LR 426 | 100 | 19.5 | 8 = − 60 ( 2') | 12 = 20 |
| LR 428 | 90 | 18.5 | 15 = − 40 ( 2') | — |
| LR 429 | 175 | 52 | 12 = − 60 ( 2') | 18 = 20 |
| LR 437 | 500 | — | — | 120 = 50 |
| LR 468 | 100 | 40 | 10 = − 45 ( 2') + 40 ( 10') | — |
| LR 484 | 75 | 30 | 3 = − 100 ( 7') | — |
| LR 485 | 250 | — | — | 25 = 10 |
| LR 487 | 150 | — | — | 15 = 20 |
| LR 489 | 150 | — | — | 15 = 30 |
| LR 490 | 75 | — | — | 7.5 = 30 |
| LR 491 | 35 | — | — | 3.5 = 20 |
| LR 499 | 75 | 35 | 10 = − 70 ( 5') | — |
| LR 500 | 75 | 25 | 5 = − 45 ( 2') | — |
| LR 508 | 150 | 30 | 3 = − 40 ( 2') | — |

The figures in brackets indicate the duration of hypotension expressed in minutes.

The following examples illustrate the invention.

The melting and boiling points are not corrected.

The identity of the substances and their purity were checked by elementary analysis of C, H, N (and halogens whenever present), infra-red spectrum analysis, NMR and U.V.

All the products set out in this invention have not yet been dealt with in literature, with the exception of:

a. 2-methyl-2-(beta-dimethylaminoethyl)-1,3-benzodioxole.
2-methyl-2-(beta-piperidinoethyl)-1,3-benzodioxole.
2-methyl-2-(gamma-dimethylaminopropyl)-1,3-benzodioxole.
2-methyl-2-(gamma-piperidinopropyl)-1,3-benzodioxole.

G. Benoit, B. Millet. Bull. Soc. Chim. Fr. 638, (1960), however the pharmacological properties of these have not been described yet.

b. 1-(1,3-benzodioxol-2-yl)-2-isopropylamino ethanol.

British Patent No. 1,135,340 (I.C.I.) stated to be useful in the prophylaxis of angina pectoris, cardiac arrhythmias and hypertension.

EXAMPLE 1

N-Methyl-beta-(2-methyl-1,3-benzodioxol-2-yl)-ethylamine 10.1 grams of N-methyl-4-amino-butan-2-one and 35.9 g. of pyrocatechol are dissolved in 100 cc. benzene and heated at 70°C. While stirring, 36 g. of $P_2O_5$ are added a little at a time. Once the addition is over, the mixture is heated to reflux for 1 hour. After cooling, the benzene solution is poured onto ice and is made alkaline with NaOH. The separated organic phase is washed with dilute NaOH and with $H_2O$. It is dried over $Na_2SO_4$ and the solvent is eliminated in a vacuum. The residual oil is used to obtain the hydrochloride, m.p. 139°–40°C. (alcohol).

Analogously one can prepare:
N-ethyl-beta-(2-methyl-1,3-benzodioxol-2-yl)-ethylamine hydrochloride, m.p. 174°–75°C. (alcohol-ether).

EXAMPLE 2

N,N-Diethyl-N'-(2-phenyl-1,3-benzodioxol-2-yl-ethyl)-ethylene diamine 13 g. of 2-phenyl-2-beta-chloroethyl-1,3-benzodioxole and 11.7 g. of N,N-diethyl-ethylene diamine are heated in a sealed tube at 150°C. for 10 hours. After cooling, anhydrous diethyl ether is added and the precipitated solid is filtered off. The ether solution is evaporated to dryness. The dimaleate of the residual oil is prepared, m.p. 160°–62°C. (from $CH_3OH$).

Analogously one can obtain:
N,N-diethyl-N'-(2-methyl-1,3-benzodioxol-2-yl-ethyl)-ethylene diamine (dimaleate, m.p. 152°–54°C. from isopropyl alcohol).
N,N-dimethyl-N'-(2-methyl-1,3-benzodioxol-2-yl-ethyl)-ethylene diamine (dihydrochloride, m.p. 254°–55°C. from alcohol).
2-methyl-2-beta-morpholinoethyl-1,3-benzodioxole (hydrochloride, m.p. 229°–31°C. from alcohol).
N-isopropyl-2-(2-methyl-1,3-benzodioxol-2-yl)-ethylamine (maleate, m.p. 164°–65°C. from isopropyl alcohol).
N-methyl-N'-(2-methyl-1,3-benzodioxol-2-yl-ethyl)-piperazine (hydrochloride, m.p. 202°–5°C. from alcohol).
N-beta-hydroxyethyl-N'-(2-methyl-1,3-benzodioxol-2-yl-ethyl)-piperazine (dihydrochloride, m.p. 235°–36°C. from absolute alcohol).
N-phenyl-N'-(2-methyl-1,3-benzodioxol-2-yl-ethyl)-piperazine (dihydrochloride, m.p. 228°–31°C).
N,N-bis(beta-hydroxyethyl)-2-(2-methyl-1,3-benzodioxol-2-yl)-ethylamine (b.p. 190°–210°C./0.6 mm.Hg).
N,N-diethyl-N'-[(2-methyl-1,3-benzodioxol-2-yl)-ethyl]-propylene diamine (hydrochloride, m.p. 174°–175°C).
N,N-diethyl-N'-methyl-N'-[(2-methyl-1,3-benzodioxol-2-yl)-ethyl]-ethylene diamine (dimaleate, m.p. 124°–6°).
N,N-diethyl-N'-spiro-[(1,3-benzodioxol-2,1'-cyclohexan-2'-yl)-methyl]-ethylene diamine (dimaleate, M.P. 146°–8°C. from absolute alcohol).
N-(N',N'-diethylaminoethyl)-2-(2-methyl-1,3-benzodioxol-2-yl)-propylamine (dimaleate, m.p. 131°–2°C).
N,N-diethyl-N'-[(2-methyl-5-nitro-1,3-benzodioxol-2-yl)-ethyl]-ethylene diamine (oxalate, m.p. 127°–28°C).
N-benzyl-beta-(2-methyl-1,3-benzodioxol-2-yl)-ethylamine (hydrochloride, m.p. 190°–91°C. from alcohol).
N,N-diethyl-N'-(2-methyl-5-chloro-1,3-benzodioxol-2-yl-ethyl)-ethylene diamine (dihydrochloride, m.p. 184°–5°C. from absolute alcohol).
N-(2-methyl-1,3-benzodioxol-2-yl-ethyl)-3-(3'-methylpiperidine)-propylamine (dihydrochloride, m.p. 220°–221°C. from absolute alcohol).
N,N-diethyl-N'-(2-methyl-1,3-naphthodioxol-2-yl-propyl)-ethylene diamine (dihydrochloride, m.p. 187°–8°C from absolute alcohol).
2-beta-morpholinoethyl)-2-methyl-5-nitro-1,3-benzodioxole (hydrochloride, m.p. 230°–32°C. from alcohol).
2-methyl-2-beta-morpholinoethyl-4-methoxy-1,3-benzodioxole.
2-methyl-2-gamma-morpholinopropyl-4-methoxy-1,3-benzodioxole.
N,N-diethyl-N'-(2-methyl-5,6-dibromo-1,3-benzodioxol-2-yl-ethyl)-ethylene diamine (dihydrochloride, m.p. 208°–9°C. from absolute alcohol).
N,N-diethyl-N'-(2-methyl-1,3-benzodioxol-2-yl-methyl)-ethylene diamine (dimaleate, m.p. 134°–5°C. from alcohol).

2-Phenyl-2-beta-chloroethyl-1,3-benzodioxole can be obtained in the following way:

a. 27 g. of methyl (2-phenyl-1,3-benzodioxol-2-yl)acetate (which can be obtained as described in the Applicant's Italian Patent Application No. 20407 A/72 and No. 32458 A/72) are dissolved in 200 cc. anhydrous diethyl ether and added drop by drop to a suspension of 4.82 g. $LiAlH_4$ in 100 cc. anhydrous ether. The mixture is heated to reflux for 2 hours, then it is worked up by the standard process. 26.2 g. of 2-phenyl-2-beta-hydroxyethyl-1,3-benzodioxole are obtained and purified by crystallisation from benzene-hexane; m.p. 60°–61°C.

b. 10 g. of 2-phenyl-2-beta-hydroxyethyl-1,3-benzodioxole, dissolved in 10 cc. anhydrous pyridine, are treated with 4 cc. thionyl chloride and made to react for 2 hours. The reaction mixture is then poured on ice and extracted with diethyl ether. The organic phase, which is first washed with a solution of NaHCO$_3$ and later with H$_2$O, is dried over Na$_2$SO$_4$. The solvent is removed in a vacuum and the residual oil is distilled, b.p. 175°–185°C/0,4 mm. Hg.

Analogously the following intermediate products can be prepared:
2-ethyl-2-beta-hydroxyethyl-1,3-benzodioxole (b.p. 96°–100°C./0,4 mm.Hg).
2-ethyl-2-beta-chloroethyl-1,3-benzodioxole (b.p. 70°–73°C./0.2 mm.Hg.
2-methyl-2-alpha-methyl-beta-hydroxyethyl-1,3-benzodioxole (b.p. 150°C./0.3 mm.Hg.).
2-methyl-2-alpha-methyl-beta-chloroethyl-1,3-benzodioxole (oil, b.p. 170°–175°C./0.3 mm.Hg.).
spiro-[1,3-benzodioxol-2,1'-cyclohexane]-2'-methanol (m.p. 65°–66°C. from hexane).
spiro-[1,3-benzodioxol-2,1'-cyclohexane]-2'-methyl chloride (m.p. 130°–40/0.4 mm.Hg.).
2-methyl-2-beta-hydroxyethyl-4-methoxy-1,3-benzodioxole (b.p. 140°–45°/0.4 mm.Hg.).
2-methyl-2-beta-chloroethyl-4-methoxy-1,3-benzodioxole.

The 2-methyl-2-beta-chloroethyl-1,3-benzodioxole was prepared as described by G. Benoit, B. Millet, Bull. Soc. Chim. Fr. 638 (1960).

The 2-methyl-2-beta-chloroethyl-5-nitro-1,3-benzodioxole can be prepared as follows: 9 g. of 2-methyl-2-beta-chloroethyl-1,3-benzodioxole are added drop by drop to 120 cc. of dilute HNO$_3$ cooled to about 10°C. After 2 hours the precipitated solid is filtered off and crystallised from benzene-hexane, m.p. 38°–40°C.

The 2,5-dimethyl-2-beta-chloroethyl-1,3-benzodioxole was prepared as follows: 19 g. of P$_2$O$_5$ are added a little at a time to a solution of 7.9 g. of 4-chlorobutanone and 9.3 g. of 4-methyl-pyrocatechin in 70 cc. benzene, at a temperature below 30°C. After 2 hours, the benzene phase is decanted and washed with H$_2$O and dilute NaOH. It is dried over Na$_2$SO$_4$. The solvent is eliminated in a vacuum, and the residue is purified by distillation; b.p. 135°–50°C./0.3 mm.Hg.

The 2-methyl-2-gamma-chloropropyl-1,3-naphthodioxole was prepared as described by M. Rosenberger et al. - Helv. Chim. Acta 55 (1972), 249. In the same way, 2-methyl-2-gamma-chloropropyl-4-methoxy-1,3-benzodioxole was prepared (b.p. 190°–200°C./0.3 mm.Hg.).

The 2-methyl-2-beta-chloroethyl-5-chloro-1,3-benzodioxole was prepared as follows: 20 g. of 2-methyl-2-β-chloroethyl-1,3-benzodioxole are dissolved in 70 cc. acetic anhydride through which the theoretical quantity of Cl$_2$ is bubbled under cool conditions. The mixture is allowed to stand for 24 hours, poured on ice and extracted by ether. The solvent is eliminated in a vacuum and purified by distillation (b.p. 90°–5°C./0.3 mm.Hg.).

In the same way, the 2-methyl-2-beta-chloroethyl-5,6-dibromo-1,3-benzodioxole is prepared (m.p. 87°–9°C., benzene-hexane).

EXAMPLE 3

2-p-Fluorophenyl-2-(gamma-pyrrolidinopropyl)-1,3-benzodioxole 6 g. of 2-p-fluorophenyl-2-(gamma-chloropropyl)-1,3-benzodioxole and 2.92 g. of pyrrolidine are dissolved in 100 cc. xylene and refluxed for 24 hours in the presence of potassium iodide. After cooling, the solution is decanted and dried. The citrate of the residual oil is prepared: m.p. 137°–38°C. (from alcohol).

In the same way can be prepared:
2-p-fluorophenyl-2-(gamma-N-phenyl-piperazinopropyl)-1,3-benzodioxole (dihydrochloride m.p. 225°C. from alcohol).

The starting material, 2-p-fluorophenyl-2-(gamma-chloropropyl)-1,3-benzodioxole, can be obtained as follows: 100 g. of P$_2$O$_5$ is added a little at a time, over half an hour, to a mixture of 65 g. of p-fluoro-gamma-chloro-butyrophenone and 100 g. of pyrocatechin, heated at 90°C. After 15 minutes the heating is stopped and 1 litre of benzene is added. The organic phaes is decanted. It is then repeatedly washed with NaHCO$_3$ and H$_2$O until neutrality is achieved and finally dried over Na$_2$SO$_4$. The solvent is removed in a vacuum and the residual oil is fractionated, b.p. 170°–78°C. (2 mm.Hg.).

EXAMPLE 4

N,N-Diethyl-N'-[(2-methyl-1,3-benzodioxol-2-yl)-ethyl]-ethylene diamine.

35 g. of N-(N',N'-diethylaminoethyl)-2-(2-methyl-1,3-benzodioxol-2-yl)-acetamide are dissolved in 100 cc. anhydrous ether and added drop by drop to a suspension of 5 g. of LiAlH$_4$ in 500 cc. anhydrous ether. The mixture is refluxed for 24 hours and then worked up by the standard procedure. The crude product from the reaction is purified by salification with maleic acid. (dimaleate, m.p. 136°–38°C., from isopropyl alcohol).

Analogously can be obtained:
N,N-diethyl-N'-[(2-methyl-1,3-benzodioxol-2-yl)-propyl]-ethylene diamine (dimaleate, m.p. 131°–2°C. from isopropyl alcohol).
N,N-dimethyl-2-(2-phenyl-1,3-benzodioxol-2-yl)-ethylamine (hydrochloride, m.p. 225°–6°C. from alcohol).
N,N-diethyl-N'-[(2-methyl-4-methoxy-1,3-benzodioxol-2-yl)-ethyl]-ethylene diamine.
N,N-diethyl-N'-[(2,5-dimethyl-1,3-benzodioxol-2-yl)-ethyl]-ethylene diamine (dimaleate, m.p. 145°–147°C. from absolute ethanol). The starting materials can be obtained as described in the Applicant's Italian Patent Application No. 20409 A/72 and Nr. 32458 A/72.

EXAMPLE 5

1-(2-Phenyl-1,3-benzodioxol-2-yl)-2-aminopropane.

6.5 g. of 3-(2-phenyl-1,3-benzodioxol-2-yl)-propan-2-one oxime are dissolved in 170 cc. ethanol and reduced with hydrogen in the presence of 1 g. Raney Nickel. When the theoretical quantity of hydrogen has been absorbed, the solution is filtered and dried. The maleate is obtained from the residue: m.p. 152°–3°C. (isopropyl alcohol).

Analogously one can obtain
1-(2-methyl-1,3-benzodioxol-2-yl)-2-aminopropane.

The starting material, namely 3-(2-phenyl-1,3-benzodioxole-2-yl)-propan-2-one oxime, can be prepared as follows:
a. 3-(2-phenyl-1,3-benzodioxol-2-yl)-propan-2-one: 9.2 g. of pyrocatechin dissolved in 50 cc. dimethylformamide are added, under cool conditions, to a suspension of 8 g. NaH (50% in mineral oil) in 100 cc. dimethylformamide. After 1/2 hour, under vigorous stirring and keeping the temperature below 30°C., a dibrombenzalacetone solution is added (25.5 g. in 50 cc. dimethylformamide). It is left to react for 12 hours and the solvent is removed under reduced pressure. The residue is treated with $H_2O$ and extracted with diethyl ether. The separated organic phase is repeatedly washed with 10% NaOH and then with $H_2O$ until neutral. It is evaporated to dryness and the residual oil is fractionated: b.p. 140°–150°C./1 mm.Hg.

When sodium methoxide is the condensing agent, 2-acetyl-3-phenyl-1,4-benzodioxane is obtained as a by-product.

b. 15 g. of 3-(2-phenyl-1,3-benzodioxol-2-yl)-propan-2-one, 4.55 g. of hydroxylamine hydrochloride and 8.9 cc. pyridine in 45 cc. ethanol are heated to reflux for 3 hrs. The solvent is removed in a vacuum and $H_2O$ (40 cc.) is added. After one-half hour, the solid which has formed is filtered off, and crystallised from 60% alcohol, m.p. 122°–23°C.

In the same way, 3-(2-methyl-1,3-benzodioxol-2-yl)-propan-2-one oxime (m.p. 93°–4°C., alcohol) can be obtained from 3-(2-methyl-1,3-benzodioxol-2-yl)-propan-2-one [prepared as described by H. T. Arnold et al. J.A.C.S., 64, 1410 (1942)].

EXAMPLE 6

N-Isopropyl-alpha[(2-(phenyl-1,3-benzodioxol-2-yl)-methyl)]ethylamine.

0.15 g. of platinum oxide are placed in a 1-litre hydrogenation vessel containing 50 cc. absolute alcohol and reduced to platinum by stirring in hydrogen atmosphere for 15 minutes. A solution of 9.9 g. of 3-(2-phenyl-1,3-benzodioxol-2-yl)-propan-2-one and 0.9 g. of isopropylamine in 100 cc. absolute alcohol is added. The mixture is then reduced at 2 atmospheres for 9 hours with hydrogen. It is then filtered and the filtrate evaporated. The maleate of the residual oil is prepared: m.p. 202°–203°C. (alcohol).

EXAMPLE 7

2-(2-Methyl-1,3-benzodioxol-2-yl)-ethylamine

One can proceed in two ways:

a. 15 g. of N-benzyl-2-(2-methyl-1,3-benzodioxol-2-yl)-ethylamine hydrochloride are dissolved in 1.5 litres of absolute alcohol and hydrogenated at room temperature and pressure in the presence of 15 g. of palladium on carbon. When the theoretical quantity of hydrogen has been absorbed, the mixture is filtered, the filtrate evaporated, the residual solid is crystallised from absolute alcohol: m.p. 198°–99°C.

b. 7.5 g. of NaOH in 80 cc. $H_2O$ are placed in a flask fitted with a mechanical stirring device and dipped in an ice bath. While stirring 9.58 g. bromine are added to the solution. When the solution reaches a temperature below 0°C., 10.2 g. of (2-methyl-1,3-benzodioxol-2-yl)-propionamide are added in one go. The mixture is stirred for 15 minutes and then refluxed for 1 hour. After cooling, it is extracted several times with ether. The combined ether phases are dried over $Na_2SO_4$ and then evaporated. The hydrochloride of residual oil is prepared, m.p. 198°–99°C. (after recrystallisation from absolute alcohol).

EXAMPLE 8

4-Pyrrolidino-1-(2-phenyl-1,3-benzodioxol-2-yl)-butan-2-one.

0.9 g. of para-formaldehyde and 5.1 g. of (2-phenyl-1,3-benzodioxol-2-yl)-propan-2-one are added to a solution of 1.56 g. of pyrrolidine in 30 cc. absolute alcohol. The product is heated at 50°C. for 3 hours. The solvent is removed in a vacuum and the residue is treated with dilute HCl when cold. The solution is extracted repeatedly with ether. The aqueous acid phase is then made alkaline with dilute NaOH and extracted wwith $CHCl_3$. The chloroform extract is dried over $Na_2SO_4$ and evaporated. The maleate of the residual oil is prepared: m.p. 130°–131°C. (isopropyl alcohol).

EXAMPLE 9

1-(2-Phenyl-1,3-benzodioxol-2-yl)-2-hydroxy-3-piperidinopropane.

4.4 g. of 1-(2-phenyl-1,3-benzodioxol-2-yl)-2-hydroxy-3-chloropropane are heated in a sealed tube together with 8.9 g. piperidine in the presence of potassium iodide for 48 hours at a temperature of 150°C. After cooling, the mixture is treated with anhydrous ether and the precipitated solid is filtered off. The ether solution is evaporated and purified by distillation: b.p. 155°–65°C./0.2 mm.Hg.

The starting material, 1-(2-phenyl-1,3-benzodioxol-2-yl)-2-hydroxy-3-chloropropane, can be prepared as follows:

a. 3-chloro-1-(2-phenyl-1,3-benzodioxol-2-yl)-propanone-2.

10.5 g. of (2-phenyl-1,3-benzodioxol-2-yl) acetic acid are dissolved in 10 cc. anhydrous benzene and heated to reflux with 10 cc. $SOCl_2$ for 3 hours. The solvent and the excess thionyl chloride are removed in a vacuum. The residual oil is dissolved in 150 cc. anhydrous ether and then added, drop by drop, to an ether solution of diazomethane chilled by ice, keeping the temperature below 2°–3°C. After 12 hours and under the same chilling conditions, a slow flow of gaseous HCl is bubbled through the reaction mixture. The latter is then poured on ice and the organic phase is separated. After several washes with $H_2O$, it is dried over $Na_2SO_4$. The solvent is removed in a vacuum and the residual oil is purified by distillation: b.p. 155°–56°C./0.2 mm.Hg.

b. 1-(2-phenyl-1,3-benzodioxol-2-yl)-2-hydroxy-3-chloropropane.

6.1 g. of 3-chloro-1-(2-phenyl-1,3-benzodioxol-2-yl)-propan-2-one are dissolved in 75 cc. methanol, cooled at −5°C. and then treated with 0.44 g. of $NaBH_4$. After 2 hours, the product is neutralised with acetic acid and the solvent is removed in a vacuum. It is again taken up in water and extracted several times with diethyl ether. After drying over $Na_2SO_4$, the organic phase is evaporated. The residual oil, 1-(2-phenyl-1,3-benzodioxol-2-yl)-2-hydroxy-3-chloropropane, is used as it is for the reaction with piperidine.

EXAMPLE 10

2-Phenyl-2-(alpha-cyano-gamma-pyrrolidinopropyl)-1,3-benzodioxole.

1 g. of NaH (50% in mineral oil) is added with stirring and cooling to 4.8 g. of (2-phenyl-1,3-benzodioxol-2-yl)-acetonitrile dissolved in 70 cc. anhydrous dimethylformamide. After 1 hour, 3.35 g. of beta-chloro-ethylpyrrolidine dissolved in 40 cc. dimethylformamide are added drop by drop. The mixture is heated to reflux for 4 hours. The solution is poured on ice, acidified with 10% HCl and extracted several times with diethyl ether. The aqueous phase, made alkaline with 10% NaOH, is extracted with ether. The ether phase is dried over Na₂SO₄ for 24 hours and then evaporated. The citrate of the residual oil is prepared: m.p. 159°–61°C. (from isopropyl alcohol).

The (2-phenyl-1,3-benzodioxol-2-yl)-acetonitrile was prepared by the method described in the Applicant's Italian Patent Application No. 20407 A/72 and No. 32458 A/72.

EXAMPLE 11

N-Phenyl-N'-methyl-N'-[(2-methyl-1,3-benzodioxol-2-yl)-ethyl]-piperazinium iodide.

40 cc. Methyl iodide are added to a solution of 8.4 g. of N-phenyl-N'-[(2-methyl-1,3-benzodioxol-2-yl)-ethyl]-piperazine in 350 cc. acetone. After 24 hours, the solvent is removed in a vacuum. It is taken up again with anhydrous ether and the resulting solid is filtered, m.p. 178°–80°C.

In the same way, one can prepare:
trimethyl-[(2-phenyl-1,3-benzodioxol-2-yl)-ethyl]-ammonium iodide (m.p. 230°–32°C.)
N-methyl-N-[(2-methyl-1,3-benzodioxol-2-yl)ethyl]-morpholinium iodide (m.p. 213°–14°C.).

EXAMPLE 12

2-Methyl-2-(β-piperidinoethyl)-5-piperidinomethyl-1,3-benzodioxole.

6.2 g. of piperidine are added to 8.5 g. of 2-methyl-2-β-chloroethyl-5-chloromethyl-1,3-benzodioxole drop by drop, without heating. After 24 hours, the mixture is dissolved in anhydrous ether, filtered and evaporated. The residue is made to react with an additional 6.2 g. of piperidine in a sealed tube at 150°C. for 12 hours. 100 cc. diethyl ether are added to the reaction mixture which is then filtered and evaporated. The hydrochloride of the residue is prepared: m.p. 289°–90°C. (from absolute alcohol, it crystallises with 0.5moles H₂O).

The starting material, 2-methyl-2-β-chloroethyl-5-chloromethyl-1,3-benzodioxole, is prepared as follows: a rapid flow of gaseous HCl is bubbled through a mixture of 20 g. of 2-methyl-2-β-chloroethyl-1,3-benzodioxole and 80 cc. concentrated HCl cooled to −5°C. 60 cc. 40% formaldehyde are added drop by drop, making sure that the temperature does not rise higher than 5°C. When the addition is completed, the mixture is extracted with ether and the ether phase is washed until neutral, dried and fractionally distilled, b.p. 200°–220°C. at 0.3 mm.Hg.

EXAMPLE 13

2-Methyl-2-beta-morpholinoethyl-5-amino-1,3-benzodioxole.

6 g. of 2-methyl-2-beta-morpholinoethyl-5-nitro-1,3-benzodioxole dihydrochloride are suspended in 300 cc. 95% alcohol and hydrogenated at room temperature and a pressure of 2 atmospheres in the presence of 3 g. of Raney Nickel. After the hydrogen has been theoretically absorbed, the product is filtered through Celite and dried. The residue is dissolved in absolute alcohol and treated with alcoholic HCl under cool conditions.

Anhydrous ether is added and the mixture is filtered. The residue is crystallised from absolute alcohol, and then has m.p. 212°–13°C. (hemihydrate dihydrochloride).

EXAMPLE 14

1-p-hydroxyphenyl-2-[(2-methyl-1,3-benzodioxol-2-yl-ethyl)-amino]-propanol-1.

13 g. of 1-p-benzyloxyphenyl-2-[N-benzyl-N-(2-methyl-1,3-benzodioxol-2-yl-ethyl)-amino]-propan-1-one are dissolved in 400 cc. 95% alcohol and hydrogenated at room temperature and pressure in the presence of 1.3 g. of 10% Pd/C and two drops of concentrated HCl. Once the hydrogen has been theoretically absorbed, the product is filtered and dried. The hydrochloride of the residual oil is prepared: m.p. 212°–14°C. (from absolute alcohol).

The starting material, 1-p-benzyloxyphenyl-2-[N-benzyl-N-(2-methyl-1,3-benzodioxol-2-yl-ethyl)-amino]-propan-1-one, can be prepared as follows:

14 g. of N-benzyl-(2-methyl-1,3-benzodioxol-2-yl)-ethylamine and 13 g. of p-benzyloxy-α-bromo-propiophenone are heated to reflux for 40 hours at 120°C. in toluene. After cooling, the solid which has formed is filtered off and the filtrate is evaporated. The residue is dissolved in ether and undissolved solid is removed by filtration. The solution is evaporated and the residual oil is used without further purification.

We claim:

1. An 2-aminoalkyl-1,3-benzodioxole selected from the group consisting of N,N-diethyl-N'-(2-phenyl-1,3-benzodioxole-2-yl-ethyl)-ethylenediamine, N,N-diethyl-N'-(2-ethyl-1,3-benzodioxole-2-yl-ethyl)-ethylenediamine, N,N-dimethyl-N'-(2-methyl-1,3-benzodioxole-2-yl-ethyl)-ethylenediamine, 2-methyl-2-beta-morpholinoethyl-1,3-benzodioxole, N-methyl-N'-(2-methyl-1,3-benzodioxole-2-yl-ethyl)-piperazine, N-beta-hydroxyethyl-N'-(2-methyl-1,3-benzodioxole-2-yl-ethyl)-piperazine, N-phenyl-N'-(2-methyl-1,3-benzodioxole-2-yl-ethyl)-piperazine, N,N-diethyl-N'-(2-methyl-1,3-benzodioxole-2-yl-ethyl)-propylenediamine, N,N-diethyl-N'-methyl-N'-(2-methyl-1,3-benzodioxole-2-yl-ethyl)-ethylenediamine, N,N-diethyl-N'-spiro[1,3-benzodioxole-2,1'-cyclohexan-2-yl-methyl]-ethylenediamine, N-(N',N',-diethylaminoethyl)-2-(2-methyl-1,3-benzodioxole-2-yl)-propylamine, 2-p-fluorophenyl-2-(gamma-pyrrolidinopropyl)-1,3-benzodioxole, 2-p-fluorophenyl-2-(gamma-N-phenyl-piperazinopropyl)-1,3-benzodioxole, N,N-diethyl-N'-(2-methyl-1,3-benzodioxole-2-yl-ethyl)-ethylenediamine, N,N-diethyl-N'-(2-methyl-1,3-benzodioxole-2-yl-propyl)-ethylenediamine, N,N-dimethyl-2-(2-phenyl-1,3-benzodioxole-2-yl)-ethylamine, N,N-diethyl-N'-(2,5-dimethyl-1,3-benzodioxole-2-yl-ethyl)-ethylenediamine, 1-(2-phenyl-1,3-benzodioxole-2-yl)-2-aminopropane, 2-phenyl-2-(alpha-cyano-gamma-pyrrolidino-propyl)-1,3-benzodioxole, N-phenyl-N'-methyl-N'-(2-methyl-1,3-benzodioxole-2-yl-ethyl)-piperazinium iodide, trimethyl-(2-phenyl-1,3-benzodioxole-2-yl-ethyl)-ammonium iodide, N-methyl-N-(2-methyl-1,3-benzodioxole-2-yl-ethyl)-morpholinium iodide, 4-hydroxy-4-p-chlorophenyl-1-(2-methyl-1,3-benzodioxole-2-yl-ethyl)-piperidine, N,-N-diethyl-N'-(2-methyl-5-chloro-1,3-benzodioxole-2-yl-ethyl)-ethylenediamine, N,N-diethyl-N'-(2-methyl-5,6-dibromo-1,3-benzodioxole-2-yl-ethyl)-ethylenediamine, N,N-diethyl-N'-(2-methyl-1,3-naphthodioxole-2-yl-propyl)-ethylenediamine, 2-methyl-2-(beta-piperadine-ethyl)-5-piperidino-methyl-1,3-benzodioxole, 1-p-hydroxyphenyl-2-[(2-methyl- 1,3-benzodioxole-2-yl-ethyl)-amino]-propanol-1,N,N-diethyl-N'-(2-methyl-1,3-benzodioxole-2-yl-methyl)-ethylenediamine and a pharmaceutically acceptable salt thereof.

2. A compound of the general formula of claim 1, comprising N,N-Diethyl-N'-(2-phenyl-1,3-benzodioxole-2-yl-ethyl)-ethylenediamine and its pharmaceutically acceptable salts.

3. A compound of the general formula of claim 1, comprising N,N-Diethyl-N'-(2-ethyl-1,3-benzodioxole-2-yl-ethyl)-ethylenediamine and its pharmaceutically acceptable salts.

4. A compound of the general formula of claim 1, comprising N,N-Dimethyl-N'-(2-methyl-1,3-benzodioxole-2-yl-ethyl)-ethylenediamine and its pharmaceutically acceptable salts.

5. A compound of the general formula of claim 1, comprising 2-Methyl-2-beta-morpholinoethyl-1,3-benzodioxole and its pharmaceutically acceptable salts.

6. A compound of the general formula of claim 1, comprising N-Methyl-N'-(2-methyl-1,3-benzodioxole-2-yl-ethyl)-piperazine and its pharmaceutically acceptable salts.

7. A compound of the general formula of claim 1, comprising N-beta-Hydroxyethyl-N'-(2-methyl-1,3-benzodioxole-2-yl-ethyl)-piperazine and its pharmaceutically acceptable salts.

8. A compound of the general formula of claim 1, comprising N-Phenyl-N'-(2-methyl-1,3-benzodioxole-2-yl-ethyl)-piperazine and its pharmaceutically acceptable salts.

9. A compound of the general formula of claim 1, comprising N,N-Diethyl-N'-(2-methyl-1,3-benzodioxole-2-yl-ethyl)-propylenediamine and its pharmaceutically acceptable salts.

10. A compound of the general formula of claim 1, comprising N,N-Diethyl-N'-methyl-N'-(2-methyl-1,3-benzodioxole-2-yl-ethyl)-ethylenediamine and its pharmaceutically acceptable salts.

11. A compound of the general formula of claim 1, comprising N,N-diethyl-N'-spiro[1,3-benzodioxole-2,1'-cyclohexan-2-yl-methyl]-ethylenediamine and its pharmaceutically acceptable salts.

12. A compound of the general formula of claim 1, comprising N-(N',N'-Diethylamino-ethyl)-2-(2-methyl-1,3-benzodioxole-2-yl)-propylamine and its pharmaceutically acceptable salts.

13. A compound of the general formula of claim 1, comprising 2-p-Fluorophenyl-2-(gamma-pyrrolidinopropyl)-1,3-benzodioxole and its pharmaceutically acceptable salts.

14. A compound of the general formula of claim 1, comprising 2-p-Fluorophenyl-2-(gamma-N-phenyl-piperazinopropyl)-1,3-benzodioxole and its pharmaceutically acceptable salts.

15. A compound of the general formula of claim 1, comprising N,N-Diethyl-N'-(2-methyl-1,3-benzodioxole-2-yl-ethyl)-ethylenediamine and its pharmaceutically acceptable salts.

16. A compound of the general formula of claim 1, comprising N,N-Diethyl-N'-(2-methyl-1,3-benzodioxole-2-yl-propyl)-ethylenediamine and its pharmaceutically acceptable salts.

17. A compound of the general formula of claim 1, comprising N,N-Dimethyl-2-(2-phenyl-1,3-benzodioxole-2-yl)-ethylamine and its pharmaceutically acceptable salts.

18. A compound of the general formula of claim 1, comprising N,N-Diethyl-N'-(2,5-dimethyl-1,3-benzodioxole-2-yl-ethyl)-ethylenediamine and its pharmaceutically acceptable salts.

19. A compound of the general formula of claim 1, comprising 1-(2-Phenyl-1,3-benzodioxole-2-yl)-2-amino-propane and its pharmaceutically acceptable salts.

20. A compound of the general formula of claim 1, comprising 2-Phenyl-2-(alpha-cyano-gamma-pyrrolidino-propyl)-1,3-benzodioxole and its pharmaceutically acceptable salts.

21. A compound of the general formula of claim 1, comprising N-Phenyl-N'-methyl-N'-(2-methyl-1,3-benzodioxole-2-yl-ethyl)-piperazinium iodide and its pharmaceutically acceptable salts.

22. A compound of the general formula of claim 1, comprising Trimethyl-(2-phenyl-1,3-benzodioxole-2-yl-ethyl)-ammonium iodide and its pharmaceutically acceptable salts.

23. A compound of the general formula of claim 1, comprising N-Methyl-N-(2-methyl-1,3-benzodioxole-2-yl-ethyl)-morpholinium iodide and its pharmaceutically acceptable salts.

24. A compound of the general formula of claim 1, comprising 4-Hydroxy-4-p-chlorophenyl-1-(2-methyl-1,3-benzodioxole-2-yl-ethyl)-piperidine and its pharmaceutically acceptable salts.

25. A compound of the general formula of claim 1, comprising N,N-Diethyl-N'-(2-methyl-5-chloro-1,3-benzodioxole-2-yl-ethyl)-ethylenediamine and its pharmaceutically acceptable salts.

26. A compound of the general formula of claim 1, comprising N,N-Diethyl-N'-(2-methyl-5,6-dibromo-1,3-benzodioxole-2-yl-ethyl)-ethylenediamine and its pharmaceutically acceptable salts.

27. A compound of the general formula of claim 1, comprising N,N-Diethyl-N'-(2-methyl-1,3-naphthodioxole-2-yl-propyl)-ethylenediamine and its pharmaceutically acceptable salts.

28. A compound of the general formula of claim 1, comprising 2-Methyl-2-(beta-piperidino-ethyl)-5-piperidino-methyl-1,3-benzodioxole and its pharmaceutically acceptable salts.

29. A compound of the general formula of claim 1, comprising 1-p-Hydroxyphenyl-2-[(2-methyl-1,3-benzodioxole-2-yl-ethyl)-amino]-propanol-1 and its pharmaceutically acceptable salts.

30. A compound of the general formula of claim 1, comprising N,N-Diethyl-N'-(2-methyl-1,3-benzodioxole-2-yl-methyl)-ethylenediamine and its pharmaceutically acceptable salts.

\* \* \* \* \*